US010027527B2

(12) United States Patent
Mas Ivars et al.

(10) Patent No.: US 10,027,527 B2
(45) Date of Patent: Jul. 17, 2018

(54) METHOD AND SYSTEM FOR MOBILITY SUPPORT FOR CACHING ADAPTIVE HTTP STREAMING CONTENT IN CELLULAR NETWORKS

(75) Inventors: Ignacio Mas Ivars, Tullinge (SE); Ayodele Damola, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 929 days.

(21) Appl. No.: 13/981,385

(22) PCT Filed: Feb. 8, 2011

(86) PCT No.: PCT/IB2011/000211
§ 371 (c)(1),
(2), (4) Date: Aug. 28, 2013

(87) PCT Pub. No.: WO2012/107788
PCT Pub. Date: Aug. 16, 2012

(65) Prior Publication Data
US 2013/0332559 A1 Dec. 12, 2013

(51) Int. Cl.
*H04L 29/06* (2006.01)
*H04L 29/12* (2006.01)
(Continued)

(52) U.S. Cl.
CPC .... *H04L 29/06476* (2013.01); *H04L 61/1511* (2013.01); *H04L 65/4084* (2013.01);
(Continued)

(58) Field of Classification Search
CPC ... H04L 67/2842; H04L 69/28; H04L 67/288; H04L 61/2596; H04L 29/06476;
(Continued)

(56) References Cited

U.S. PATENT DOCUMENTS 6,014,698 A * 1/2000 Griffiths ................. 709/224
6,286,045 B1 * 9/2001 Griffiths et al. ......... 709/224
(Continued)

FOREIGN PATENT DOCUMENTS

WO WO 2007096001 A1 * 8/2007 ............ H04L 29/06
WO WO 2007142564 A1 * 12/2007
(Continued)

OTHER PUBLICATIONS

LTE, 3rd Generation Partnership Project; Technical Specification Group Services and System Aspects; Functional stage 2 description of Location Services (LCS) (Release 9), 3GPP TS 23.271 V9.5.0, 650 Route des Lucioles—Sophia Antipolis, Valbonne, France, Dec. 20, 2010.
(Continued)

*Primary Examiner* — David Lazaro
*Assistant Examiner* — Berhanu Shitayewoldetsadi
(74) *Attorney, Agent, or Firm* — Patent Portfolio Builders PLLC

(57) ABSTRACT

Mobile communication network (301), mobility node (322) and method for selecting, as a user terminal (304) moves in the mobile communication network (301) from a first node (306) to a second node (311), a cache (308 or 312) that stores a desired content and is closest to the user terminal (304). The method includes receiving a request from the user terminal (304) for a segment of the desired content; querying a mobility functionality (300) run by the mobile communication network (301) about an internet protocol, IP, address of a cache that stores the segment of the desired content; based on a location at the first node (306) or the second node (311) of the user terminal that sent the request, determining the cache (308 or 312) that stores the segment of the desired content and has a location closest to the user terminal (304); and providing the user terminal (304) with an answer that
(Continued)

includes the IP address of the closest cache that stores the segment of the desired content.

11 Claims, 9 Drawing Sheets

(51) Int. Cl.
| | |
|---|---|
| *H04L 29/08* | (2006.01) |
| *H04W 4/02* | (2018.01) |
| *H04W 8/26* | (2009.01) |
| *H04W 36/02* | (2009.01) |
| *H04W 48/08* | (2009.01) |

(52) U.S. Cl.
CPC .......... *H04L 67/1021* (2013.01); *H04L 67/18* (2013.01); *H04L 67/2842* (2013.01); *H04W 4/023* (2013.01); *H04W 4/02* (2013.01); *H04W 8/26* (2013.01); *H04W 36/023* (2013.01); *H04W 48/08* (2013.01)

(58) Field of Classification Search
CPC .............. H04L 61/1511; H04L 65/4084; H04L 67/1021; H04L 67/18; H04L 29/06; H04W 8/26; H04W 4/023; H04W 4/02; H04W 36/023; H04W 48/08
USPC ....... 709/216, 217, 223, 224, 227, 232, 246, 709/229
See application file for complete search history.

(56) References Cited

U.S. PATENT DOCUMENTS

| | | | | |
|---|---|---|---|---|
| 7,065,053 | B2* | 6/2006 | Godin et al. | .................. 370/252 |
| 7,155,451 | B1* | 12/2006 | Torres | |
| 7,349,902 | B1* | 3/2008 | Arlitt et al. | |
| 2001/0043600 | A1* | 11/2001 | Chatterjee et al. | ........... 370/390 |
| 2002/0049843 | A1* | 4/2002 | Barone et al. | ................ 709/225 |
| 2004/0267907 | A1* | 12/2004 | Gustafsson | ............. H04L 29/06 709/219 |
| 2005/0021863 | A1* | 1/2005 | Jungck | .......................... 709/246 |
| 2006/0077894 | A1* | 4/2006 | Schmuck | ............ G06F 12/0862 370/232 |
| 2006/0111914 | A1* | 5/2006 | van Deventer | ............... 704/275 |
| 2006/0112176 | A1* | 5/2006 | Liu | ................... H04L 29/12066 709/245 |
| 2006/0112716 | A1 | 5/2006 | Liu et al. | |
| 2006/0218479 | A1* | 9/2006 | Torres | .......................... 715/500 |
| 2007/0094268 | A1* | 4/2007 | Tabe | ............................... 707/10 |
| 2008/0250142 | A1* | 10/2008 | Magnusson | ........... H04W 48/20 709/225 |
| 2010/0291943 | A1* | 11/2010 | Mihaly | ............. H04L 29/12066 455/450 |
| 2012/0224578 | A1* | 9/2012 | Mih Ly | ............... H04L 12/4633 370/392 |

FOREIGN PATENT DOCUMENTS

| | | | | |
|---|---|---|---|---|
| WO | WO 2007142573 A1 * | 12/2007 | | |
| WO | WO 2008003355 A1 * | 1/2008 | ............. | H04L 29/08 |
| WO | WO 2008015187 A1 * | 2/2008 | ............. | H04N 7/173 |
| WO | WO 2008036008 A1 * | 3/2008 | ............. | H04M 3/436 |
| WO | WO 2008076023 A1 * | 6/2008 | ............. | H04N 7/16 |
| WO | WO 2008150204 A1 * | 12/2008 | ............. | H04N 7/173 |
| WO | WO 2009041869 A1 * | 4/2009 | ............. | H04L 29/06 |
| WO | WO 2009053818 A2 * | 4/2009 | ............. | H04L 29/06 |
| WO | WO 2009131505 A1 * | 10/2009 | ............. | H04L 29/06 |
| WO | WO 2010039073 A1 * | 4/2010 | ............. | H04L 29/06 |
| WO | 2010/106390 A1 | 9/2010 | | |
| WO | WO 2010110710 A1 * | 9/2010 | | |

OTHER PUBLICATIONS

"Open Service Access (OSA); Parlay X Web Services; Part 16: Geocoding (Parlay X3)," European Telecommunications Standards Institute (ETSI), ES 202 504-16, V1.1.1., May 2008, 650, Route des Lucioles, F-06921 Sophia-Antipolis, France.
Open Mobile Alliance, "Mobile Location Service Architecture, Approved Version 1.2; OMA-AD-MLS-V1_2-20110719-A," 4330 La Jolla Village Dr.,Suite 110, San Diego, CA 92122, Jul. 19, 2011.
"LCS Architecture for LTE EPS," http://libmlp-cpp.sourceforge. net/documents/mlp_summary/html/apa.html#4, posted on Aug. 7, 2010.
International Search Report and Written Opinion of the International Searching Authority issued in corresponding International Application No. PCT/IB2011/000211, dated Oct. 24, 2011.
International Preliminary Report on Patentability in corresponding PCT Application No. PCT/IB2011/000211 dated Apr. 18, 2013.

* cited by examiner

METHOD AND SYSTEM FOR MOBILITY SUPPORT FOR CACHING ADAPTIVE HTTP STREAMING CONTENT IN CELLULAR NETWORKS

TECHNICAL FIELD

The present invention generally relates to systems, software and methods and, more particularly, to mechanisms and techniques for providing mobility support for caching streaming content in a communication network.

BACKGROUND

During the past years, the evolution of computing devices such as tablets, ipods, mobile computers, mobile phones, game consoles, personal digital assistants, etc., was driven by the concept of being mobile and able to provide all the desired content to a user. Such desired content includes, for example, multimedia content.

Multimedia content consumption is exponentially increasing in operator networks, both fixed and wireless. As a way to cope with the increased traffic, the network operators are considering deploying different caching technologies that attempt to reduce both the peering costs and the access network traffic, thereby reducing the total ongoing cost for running the network. Also the Quality of Experience of accessing the content is increased as network bottlenecks on the path between the content source and user terminal are eliminated.

A factor to consider when dealing with multimedia content consumption is the mobility of the user terminal. A trend that is emerging in the way end users consume multimedia is the preference of using a mobile terminal instead of the traditional fixed computer or TV set. Operators are experiencing an exponential increase in the amount of media traffic that their clients are consuming via smart phones and tablet-like devices.

When these two trends (mobility and content consumption) are considered together, a set of technical challenges emerge in the way content is delivered. On one side, the operator wants to have localized caches that offload traffic from the core network and deliver the content to the client with the highest possible quality of experience, while, on the other side, mobile terminals roam freely in the wireless infrastructure, thereby making the operator's choice of cache to deliver the content difficult, especially when a handover has occurred.

It is now briefly discussed the current status of the art with regard to serving mobile devices while moving inside a communication network. As those skilled in the art know, the architecture for each type of network is different. For exemplary reasons, the $3^{rd}$ Generation Partnership Project (3GPP) mobility architecture is now discussed. FIG. 1 shows a general arrangement for a LoCation Service (LCS) in 3GPP. Except in the security area, many applications have been discovered and will have a greater development boost in the LBS (Location Based Services) area. The architecture for LCS is designed by 3GPP and it is used in Global System for Mobile Communications (GSM), Universal Mobile Telecommunications System (UMTS) and Evolved Packet System (EPS).

A central point of the architecture 10 is the GMLC (Gateway Mobile Location Center) 12. The GMLC 12 contains functionality required to support LCS. GMLC 12 is the first node an external LCS client 14 (e.g., a non-3GPP device) accesses in a GSM or UMTS network. The GMLC 12 may request routing information from the HLR (Home Location register, not shown) or HSS (Home Subscriber Server) 16. After performing registration authorization, the GMLC 12 sends positioning requests to either the VMSC (Visited Mobile Switching Centre, not shown), the SGSN (Serving GPRS Support Node) 17 or MSC (Mobile Switching Centre) Server 18 and receives final location information of the user terminal, which information is estimated from the corresponding entity. The VMSC, SGSN or MSC connect to the corresponding Access Network (not shown) and the Access Network will provide the positioning of the user terminal.

FIG. 1 shows various interfaces Gb, Lc, Le, Lg, Lh, Lid, Lpp, Lr, Lu, SLg, and SLs between various components of the architecture 10. For example, these interfaces are: Gb, Interface between 2G-SGSN and GERAN (GSM EDGE Radio Access Network); Lc, Interface between gateway MLC (mobile location center) and gsmSCF (CAMEL interface); Le, Interface between External User and MLC (external interface); Lg, Interface between Gateway MLC-VMSC, GMLC-MSC Server, GMLC-SGSN (gateway MLC interface); Lh, Interface between Gateway MLC and HLR (HLR interface); Lid, Interface between GMLC and PMD; Lpp: Interface between GMLC (H-GMLC) and PPR (Privacy Profile Register) entity; Lr, Interface between gateway MLCs; Lu, Interface between 3G-SGSN or MSC and GERAN or UTRAN; SLg, Interface between GMLC and MME; and SLs, Interface between MME (Mobility Management Entity) and E-SMLC. Communication between the GMLC and External LCS Client is performed by Mobile Location Protocol (MLP).

A communication between the GMLC 12 and the LCS client 14 is illustrated in FIG. 2. A general arrangement of LCS with inter-GMLC is given by 3GPP, which show that GMLC 12 includes a Visiting Gateway Mobile Location Centre (VGMLC) 12a, a Home Gateway Mobile Location Centre (HGMLC) 12b and a Requesting Gateway Mobile Location Centre (RGMLC) 12c.

Complying with 3GPP Release 7, LCS Specification, the Open Mobile Alliance (OMA) specified a basic structure for the LBS services in the OMA Mobile Location Service which consists of a set of location specification. The specification suggests the basic architectural diagram of LBS as illustrated on FIG. 3. In the detailed scheme of Location Platform shown in FIG. 3, the protocols for each interface are defined. However, the Location Privacy Checking Entity (PLCE) is not specified by OMA.

More specifically, the Mobile Location Protocol (MLP) is used for the communication between the MLS Client 20 and the Requesting Location Server 22. The MLS client 20 corresponds to the Location Services client (LCS Client) in the 3GPP context. The Location Privacy Checking Entity 24 is responsible for resolving IDs and for privacy checking. In the 3GPP context this corresponds to the Privacy Profile Register (PPR). The PPR may be a part of the GMLC. FIG. 3 also shows the Home Location Server 26 of the user terminal and the Visited Location Server 28.

From the above discussion it is noted that the traditional way of handling mobility in mobile networks is based on the described 3GPP architecture. This architecture was originally designed for scenarios where the transport protocol is based on the 3GPP RTSP/RTP specification, and where the content origin point does not change (move) in the course of the content delivery. However, the introduction of caching technologies require new techniques not covered in the original specifications of the existing systems.

An architecture for client mobility needs to take into consideration not only the user terminal position but also the status of the network links when making a decision about a source/cache from where to deliver the content. This desirable architecture also needs to be able to change the delivery point as the user terminals change radio cells.

Accordingly, it would be desirable to provide devices, systems and methods that overcome the afore-described problems and drawbacks.

SUMMARY

Assets as, for example, content are desired to be provided to the users from locations that are most suitable to the users as the users move from one cell to another cell. A suitable location may be a location that is closest to the user. In this way, receiving the content from a location closest to the user frees bandwidth in the network and/or reduces a time for receiving the asset.

According to one exemplary embodiment, there is a method for selecting, as a user terminal moves in a communication network from a first node to a second node, a cache that stores a desired content and is closest to the user terminal, the cache being one of plural caches distributed at various levels in the communication network. The method includes a step of receiving a request from the user terminal for a segment of the desired content; a step of querying a mobility functionality run by the communication network about an internet protocol, IP, address of a cache that stores the segment of the desired content; based on a location at the first node or the second node of the user terminal that sent the request, a step of determining the cache that stores the segment of the desired content and has a location closest to the user terminal; and a step of providing the user terminal with an answer that includes the IP address of the closest cache that stores the segment of the desired content.

According to another exemplary embodiment there is a communication network in which a user terminal can move from one node to another node and the communication network provide the user terminal with a desired content from an appropriate cache. The communication network includes first and second nodes being a base station or a nodeB or a enodeB or a radio network controller depending on a type of the communication network; a mobility node configured to run a mobility functionality which is configured to determine a location of the user terminal at the first node or the second node; plural caches distributed across the communication network with one or more caches storing the desired content, each of the first and second nodes having between zero and a predetermined number of caches; the mobility functionality being configured to, receive a request to identify a cache that stores a segment of the desired content, and based on a location of the user terminal at the first node or the second node, determine an internet protocol, IP, address of a cache of the plural caches that stores the segment of the desired content and is closest to a location of the user terminal. The network further includes an interface of the mobility node configured to provide the IP address of the closest cache that stores the segment of the desired content.

According to still another exemplary embodiment, there is a mobility node in a communication network for selecting a cache that stores a desired content for a user terminal. The mobility node includes a processor configured to interact with a domain name server, DNS, configured to receive a client request for a segment of the desired content; the processor is configured to run a mobility functionality and the DNS is configured to query the mobility functionality about an internet address, IP, of a cache that stores the first part of the desired content; the mobility functionality determines, based on a location of the user terminal that sent the client request, the cache that stores the segment of the desired content; and the mobility functionality is configured to send to the DNS the IP address of the cache that stores the segment of the desired content.

It is an object to overcome some of the deficiencies discussed in the previous section and to provide a mapping/mobility functionality that is capable of determining when a user terminal moves from one cell to another and identifying a best cache to serve the user terminal. One or more of the independent claims advantageously provides such a mapping/mobility functionality.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
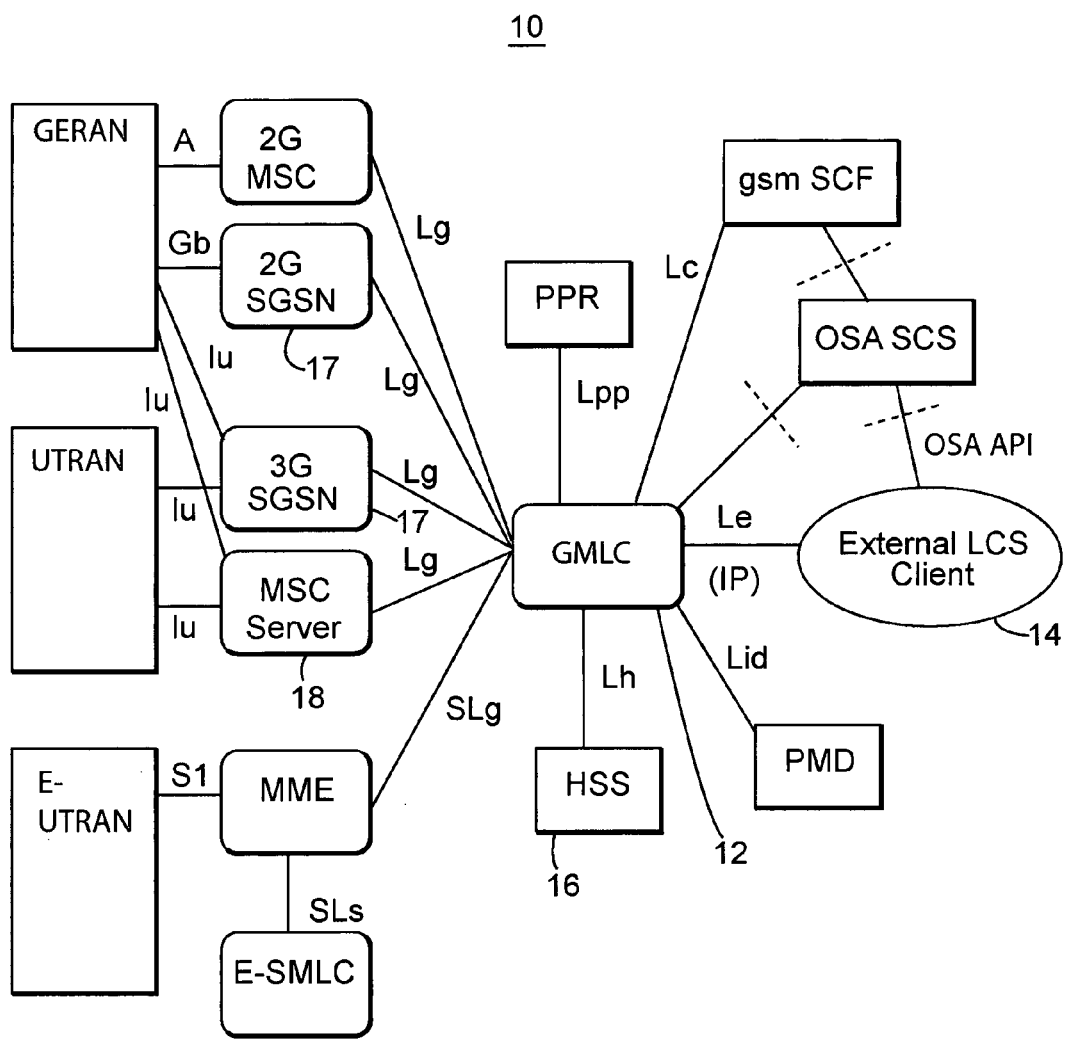
FIG. 1 illustrates a general arrangement for a location service in a communication network.
Figure 2:
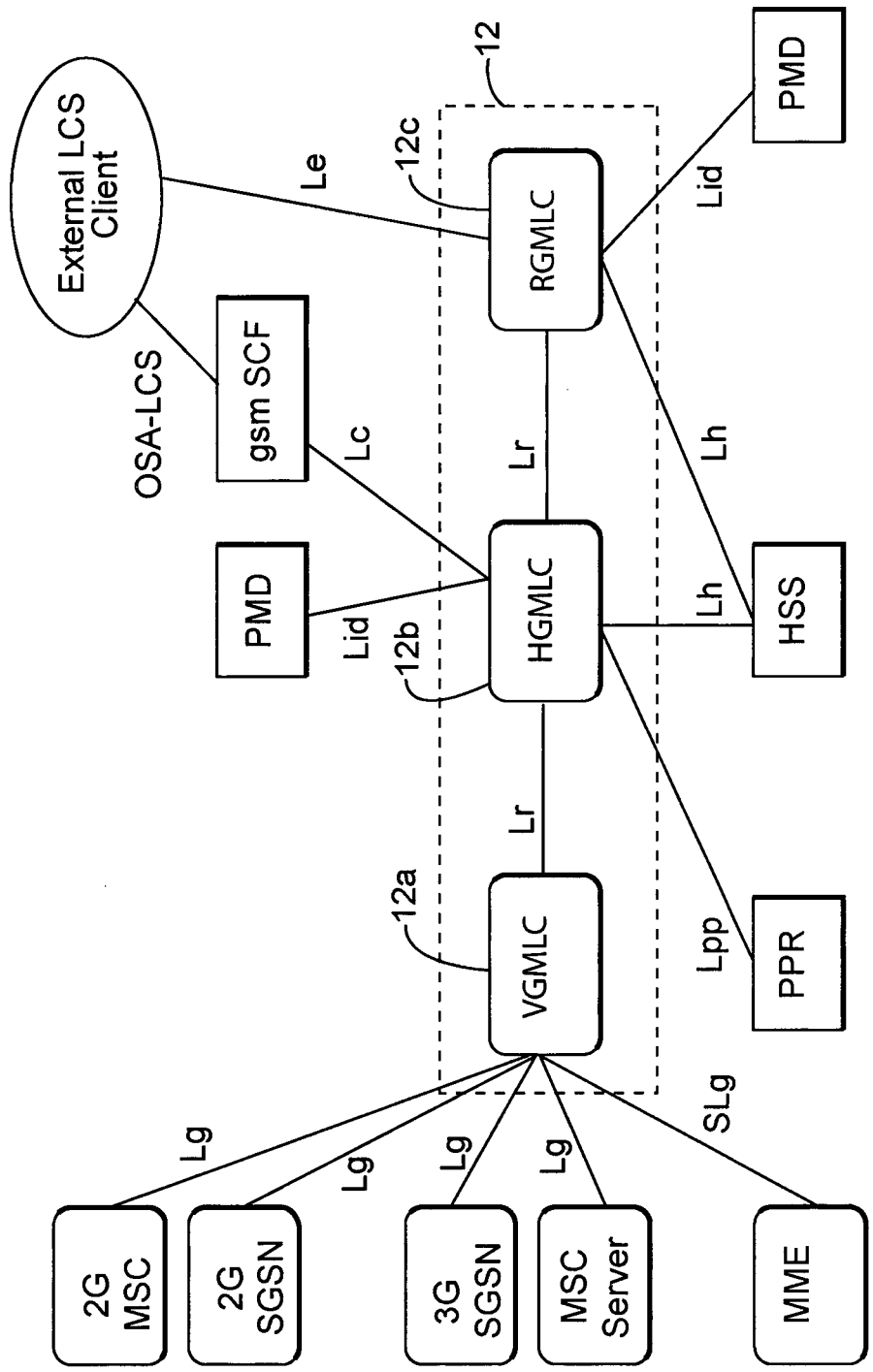
FIG. 2 illustrates a communication arrangement between a gateway mobile location center and a client in a traditional communication network.
Figure 3:
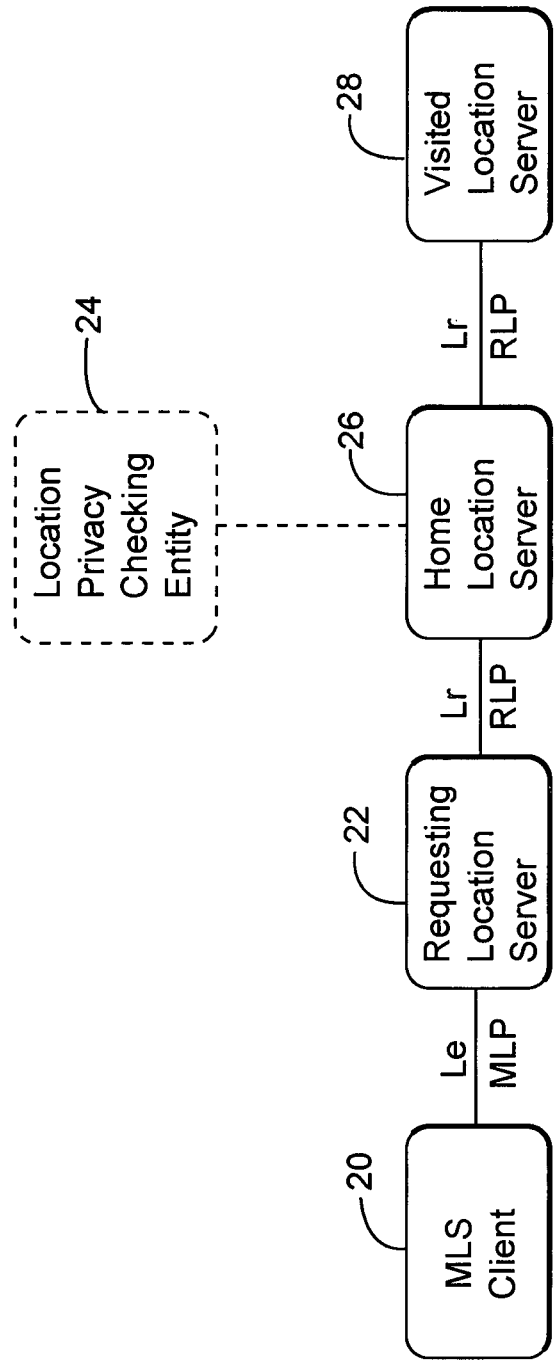
FIG. 3 illustrates an architecture of a traditional location based services in a communication network.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of Hypertext Transfer Protocol (HTTP)-based transport schemes. However, the embodiments to be discussed next are not limited to these systems but may be applied to other existing schemes.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

There are various protocols for providing content from a network to a user terminal. One of them is the HTTP chunk-based progressive download or adaptive HTTP streaming (AHS). The basics of this protocol are briefly discussed next.

The new HTTP-based media consumption paradigm works by using the principles of progressive download over media assets chunked in small pieces of several seconds (e.g., ten seconds). The AHS uses a media splitter that chunks the media assets (desired content to be downloaded by the user terminal) into small files of x seconds, where x depends on the amount of dynamicity in the delivery versus the amount of overhead incurred into. Some implementations chunk the desired content in pieces ranging from 2 to 10 seconds. However, other values are possible. All the chunks are placed in the web server as independent files and a play list (e.g., a .m3u file) is created. The play list contains the URL's of all the chunks that form a media item. The play list is published as the asset to be obtained first by the user terminal.

The user terminal connects to the web server and downloads the play list. It then proceeds to parse the play list and starts downloading one item (chunk) at a time filling the play out buffer. When the buffer is full (for example, after the third chunk has been downloaded) the play out starts while the user terminal keeps on downloading consecutive chunks one by one. Optionally, every y seconds (2 to 10 seconds) the user terminal can download again the play list to see if new or modified chunks have appeared in the list.

HTTP chunk-based streaming can be combined with the progressive download with specific byte-range metadata associated with every chunk. However, HTTP streaming creates a set of challenges in the current content delivery network (CDN) solutions. For example, chunks need to be identified as part of logical assets that should be the ones being optimized. When counting, for example, the popularity of a media asset one cannot use simple chunk hits. Another challenge for CDNs is that most CDN's are optimized for large files delivery while chunk based streaming creates a densely populated small size chunk distribution. Still another challenge for CDNs is that proper tuning of the timings is important for reducing the overhead of having signaling per chunk instead of per asset and a refresh rate of the play list.

According to an exemplary embodiment, a dynamic mapping system of URLs to the HTTP content chunks is maintained in the network in such a way that every time the user terminal moves to a new base station due to mobile handover, the system is able to point the user terminal to a relevant cache based on a proximity of the cache to the user terminal. The novel system may be able to point to the relevant cache by updating, for example, the DNS entry for the source delivery point for every chunk based on the location of the user terminal. Details of this system are now discussed.

Figure 4:
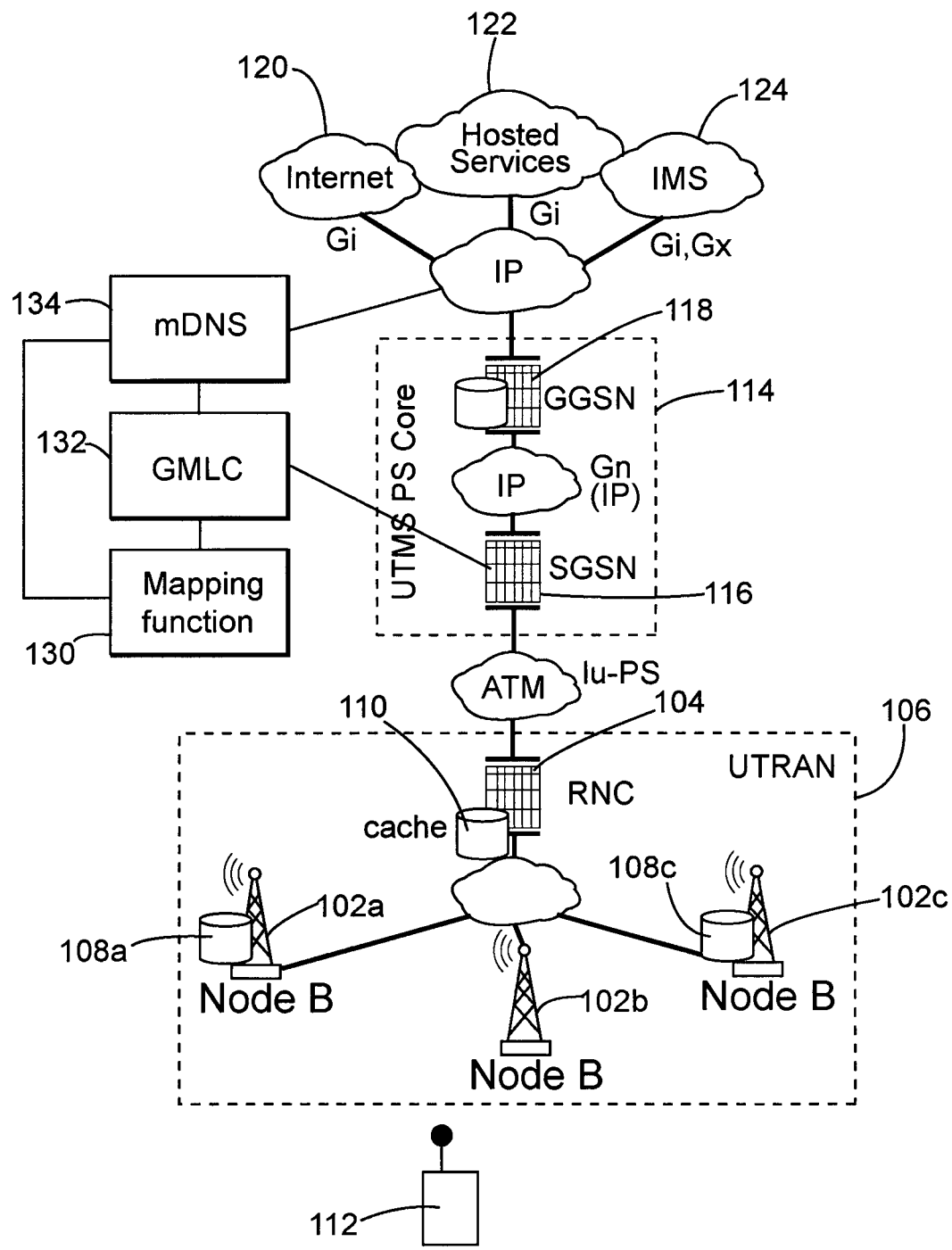
FIG. 4 is a schematic diagram of a High Speed Packet Access communication network having a mapping functionality according to an exemplary embodiment.

The novel system to be discussed next may be applied to various types of communication networks, e.g., High Speed Packet Access (HSPA 3G), Long Term Evolution (LTE 4G), etc. A basic structure of HSPA (3G) is shown in FIG. 4 in which the communication network 100 includes various nodes (NodeB) 102*a-c* that are connected to a radio network controller (RNC) 104. The nodes (also generically called base stations in this specification) 102*a-c* and RNC 104 form the Universal Terrestrial Radio Access Network (UTRAN) 106. It is noted that some of the nodes 102*a* and 102*c* have their own caches 108*a* and 108*c*, respectively, while node 102*b* does not have its own cache. Further, the RNC 104 may have one or more caches 110. A user terminal 112 is shown connected to node 102*b*.

The RNC 104 connects to a core 114 of the UTMS and the core 114 may include the SGSN 116 and the GGSN 118. The SGSN and GGSN have been previously discussed. It is noted that these elements of the network are not user terminals or peers in a peer-to-peer network. The GGSN 118 may also be connected to the Internet 120, various hosted services 122, and to the Information Management Services (IMS) 124.

The communication network 100 may have the novel system implemented as a mapping function unit 130. The mapping function unit 130 may be configured to communicate with a gateway mobile location centre (GMLC) 132 that communicates with the SGSN 116. The communication network 100 may have a modified (mobility enabled) mDNS server 134 configured to interact with the mapping function unit 130 via its own communication channel as shown in the figure. The mapping function unit 130 may have an interface to both the mDNS and the GMLC and the mapping function unit 130 may be housed by a node, a centralized node, the GMLC itself or the mDNS server. The mapping function unit 130 is configured to communicate with the mDNS 134 as discussed later and to determine the appropriate cache for the user terminal 112. For example, if the user terminal 112 is connected to node 102*b* (no cache), the mapping function unit 130 may determine that the appropriate (e.g., closest) cache is 102*a* or 110.

Figure 5:
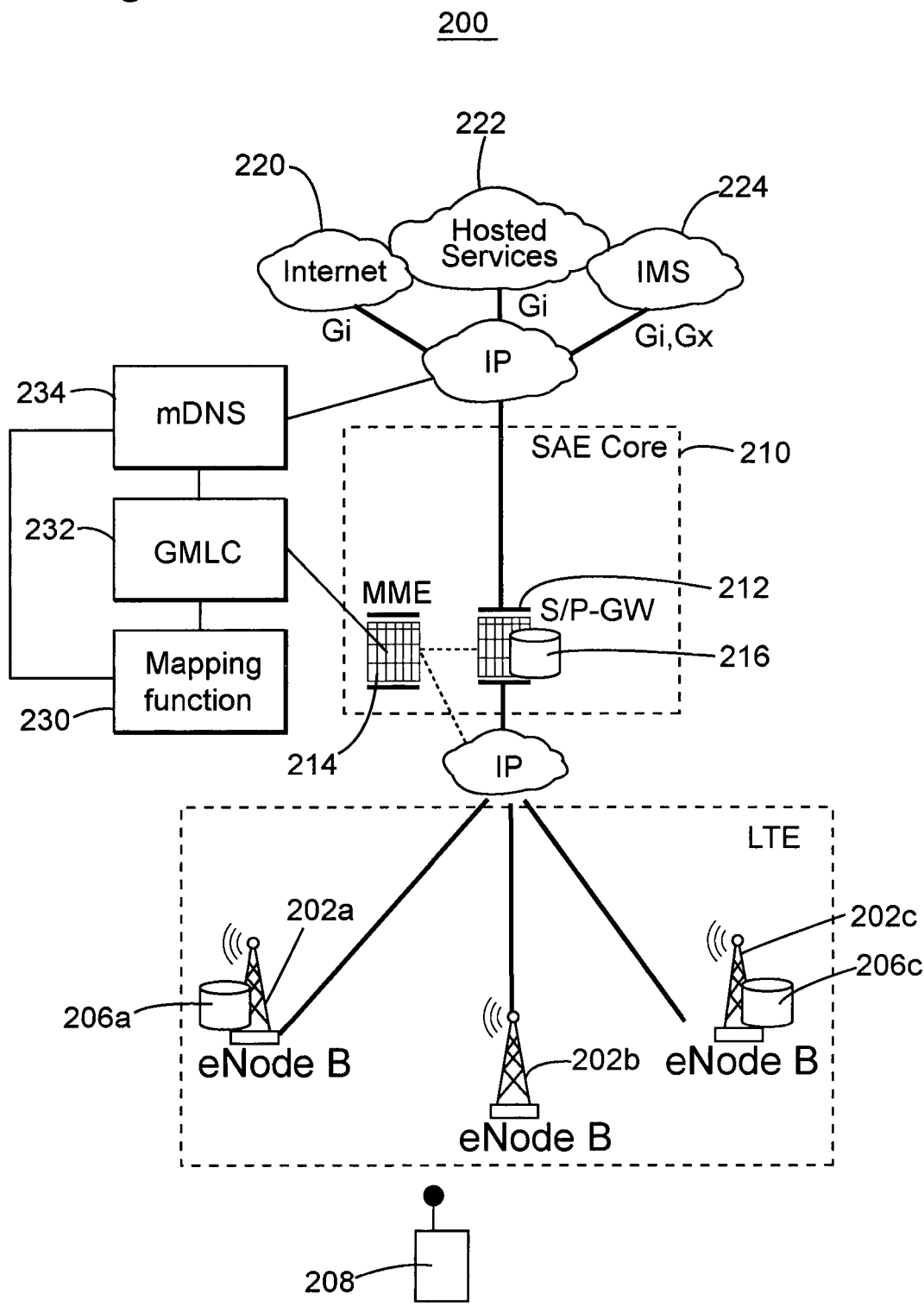
FIG. 5 is a schematic diagram of a Long Term Evolution communication network having a mapping functionality according to an exemplary embodiment.

An alternative communication network is the LTE 200 shown in FIG. 5. The LTE network 200 includes plural nodes 202*a-c*. It is noted that these nodes are eNodeBs while those in FIG. 4 where NodeBs. As all these nodes and also a radio network controller are know in the art, the generic names "node" or "base station" are used in this document. A user terminal 208 is connected to one of the nodes 202*a-c*. The nodes 202*a-c* may have their own caches 206*a* and 206*c*. The nodes 202*a-c* are connected to a system architecture evolution (SAE) core 210. The SAE core 210 may include a gateway 212 and a mobility management entity (MME) 214. The gateway 212 may have one or more caches 216. The SAE core 210 is connected to internet 220, hosted services 222, and IMS 224, which are similar to those discussed with regard to FIG. 4.

A mapping function unit 230 is added to the LTE network 200 similar to the mapping function unit 130 of FIG. 4. Similar GMLC 232 and mDNS 234 components may be provided as shown in the figure. The mapping function units 130 and 230 are now discussed with regard to FIG. 6.

Figure 6:
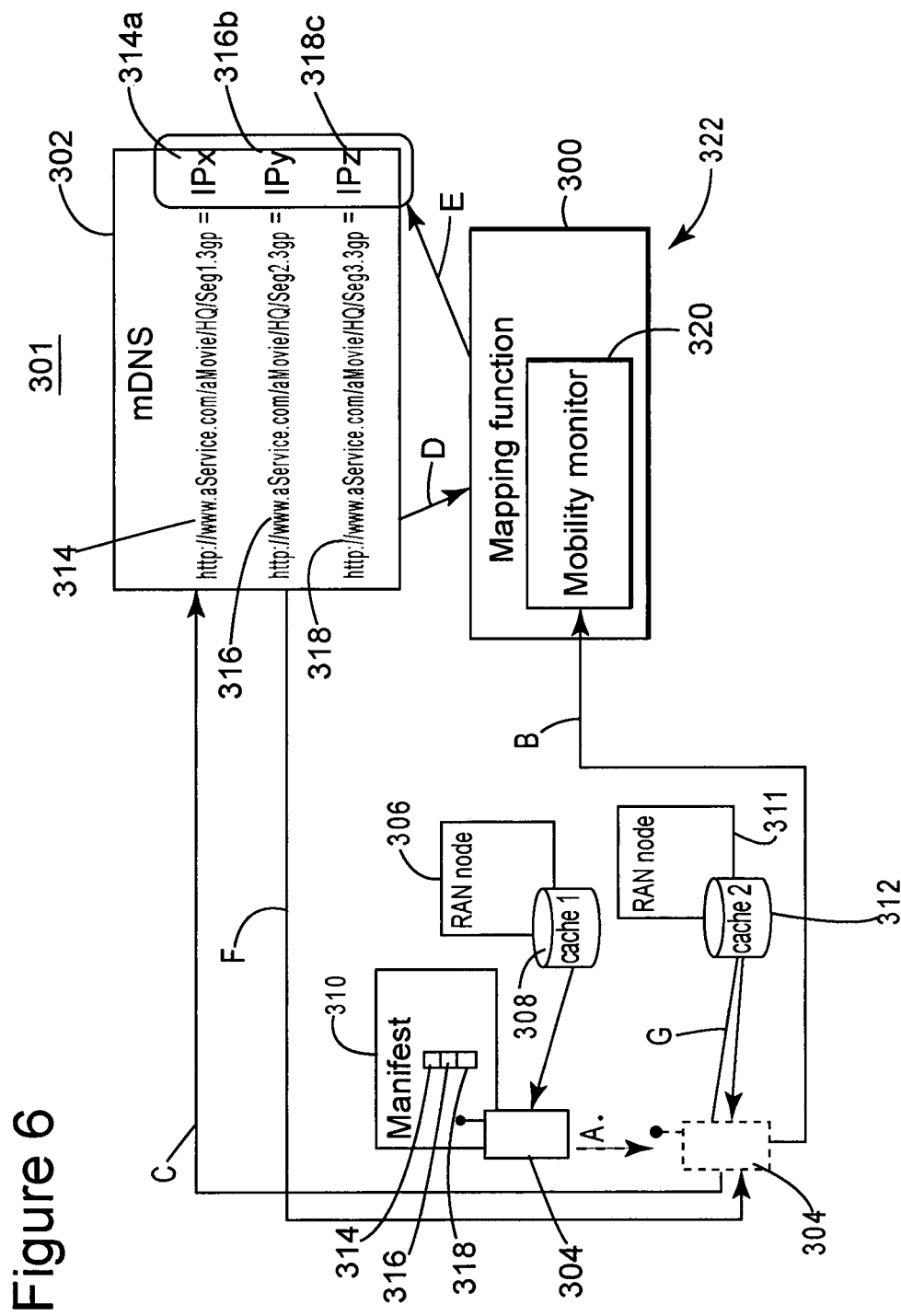
FIG. 6 is a schematic diagram of an interaction between a mapping functionality and a mobility modified DNS according to an exemplary embodiment.

FIG. 6 shows a generic mapping function unit 300 and a generic mDNS server 302 that are part of a communication network 301. These may be any of the mapping function units 130 or 230 or the mDNS servers 134 or 234 shown in FIGS. 4 and 5. A user terminal 304 is shown being connected to a first RAN node 306. The first RAN node 306 has its own cache 308. In fact, there may be plural caches distributed in the RAN node 306, either at the base station level or at a higher level, e.g., RNC 104 for network 100 or gateway 216 for network 200.

The user terminal 304 have received a manifest 310 that includes various URLs for various chunks that form a desired content to be downloaded. The desired content is located on cache 308 and the user terminal communicates with this cache to download chunk by chunk the desired content. However, in step A, the user terminal moves from the first RAN node 306 to a second RAN node 311. The second RAN node 311 may have its own system of caches, one of which is shown as 312 in FIG. 6. Cache 312 may have the content desired by the user terminal 304.

The mapping function unit 300 may include a module or functionality 320 that is configured to monitor the location of the user terminal 304. This module or functionality may be the mobility monitor 320. The mobility monitor may be implemented at a dedicated node 322 of the communication network, an existing node, may be distributed across the network, etc. The mobility monitor may be a dedicated device, software or a combination thereof.

In step B, the mobility monitor 320 detects the handover event that occurred in step A and based on the user terminal's new position determines the new IP addresses (e.g., IPx, IPy, IPz) for the same URLs that point to each media chunk included in the original media asset manifest 310. In other words, according to the example shown in FIG. 6, the manifest 310 includes three different URLs 314, 316, and 318 associated with three chunks of the desired content. These three URLs are resolved by the mDNS 302, e.g., URL 314 is associated with IP address 314a corresponding to cache 308 when the user terminal 304 is connected to the first node 306. However, when the mobility monitor 320 detects that the user terminal 304 has moved to the second node 311, and the second cache 312 has the desired content and is closer to the user terminal, the mobility monitor 320 determines the new IP addresses 314a, 316a and 318a (now associated with cache 312) of the desired content.

Thus, when the user terminal 304, now connected to the second node 311, resolves in step C the URL of the manifest 310, the mDNS 302 first enquires, in step D the mapping function 300 about the IP addresses of the required URLs. Based on the results of the mobility monitor 320, the mDNS receives in step E the new IP addresses of the required URLs (e.g., associated with cache 312 instead of cache 308).

In order to take advantage of the new IP addresses, the answers from the mDNS server are configured to include a Time To Live (TTL) value that may be equal or less than a time length of a default chunk length (e.g., 10 seconds). In other words, when the user terminal proceeds to download the next chunk to be played, it performs a DNS query for the right IP address, because the previous DNS answer contains the TTL value and the previous answer is not valid any more. As noted above, the mDNS requests in step D the new IP address of the chunk to be downloaded, the mapping function 300 provides the new IP addresses in step E, and the new IP addresses are provided in step F by the mDNS back to the user terminal 304. Then, the user terminal 304 downloads the next chunk from the new cache 312. In one application, the mapping function 300 provides only a single IP address for the next chunk to be downloaded.

It is noted that after the new chunk is downloaded, because of the TTL being shorter or equal to the length of the chunk, the user terminal has to repeat step C for each new chunk and the mDNS server 302 has to repeat step D for each new chunk requested by the user terminal 304. In one application, the TTL may be set up to be shorter than the length of the chunk. In another application, the TTL may be set up to be larger than the time length of a default chunk, so that the user terminal does not perform step C for each new chunk but only for some of the new chunks. In another application, the TTL value may be dynamically adjusted by a functionality that cooperates with the mobility monitor 320. For example, the user terminal may be instructed to perform step C only when the mobility monitor 320 determines a handover of the user terminal.

A couple of details about the mobility monitor, mobility function and the mDNS are believed to be now in order. The mobility monitor may be based on the GMLC. This node allows mobility information to be inferred for terminals in 2G, 3G and LTE networks. The mapping function may include a database (e.g., map) and system logic which makes a decision regarding which server collocated with a RAN node should a requesting user terminal be pointed to. Other features may be considered when determining the appropriate cache, e.g., traffic, available bandwidth, etc. The mDNS is an enhanced operator DNS which consults the mapping function when resolving DNS requests for HTTP chucks stored in the RAN cache system.

Figure 7:
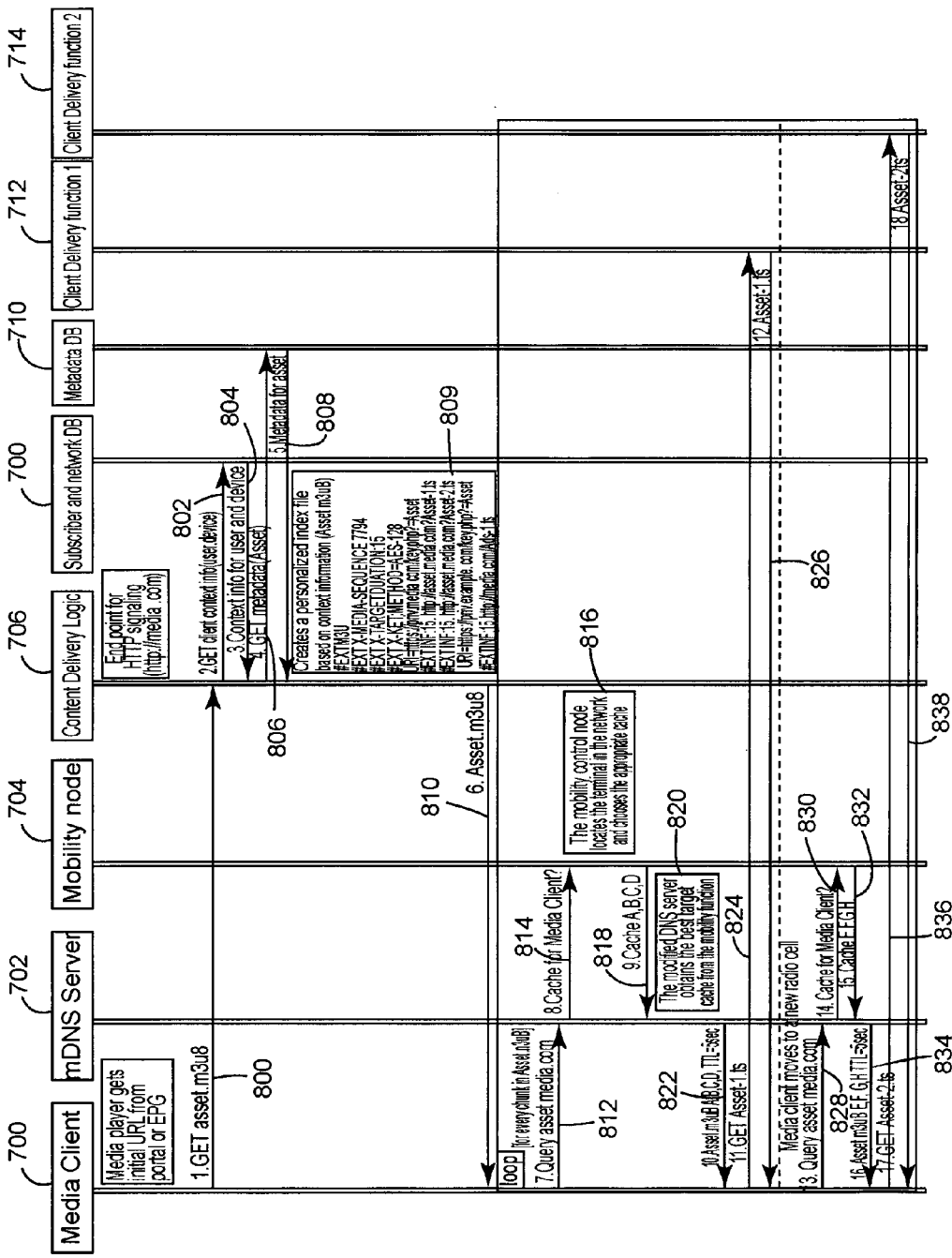
FIG. 7 is a diagram illustrating a signaling between various parts of the communication network and a mapping functionality according to an exemplary embodiment.

According to an exemplary embodiment, a signaling method for implementing the mobility support for caching adaptive HTTP streaming content in cellular networks is discussed with regard to FIG. 7. FIG. 7 shows a user terminal 700, a mDNS server 702, a mobility node 704 (that may include the mobility mapping), a content delivery logic module 706 and various other modules 708, 710, 712 and 714 that are configured to include a database about the subscribers and the network, a metadata database, and various client delivery functions. The content delivery logic module 706 may be located outside the communication network (third party) or inside the communication network.

In step 800, the user terminal 700 requests from the content delivery logic module 706 the manifest 310 shown in FIG. 6. This module requests in step 802 various information about the user terminal from the subscriber and network database 708. The subscribed and network database 708 replies in step 804 with the information about the user and the user terminal. The content delivery logic module 706 then requests in step 806 metadata from the metadata database 710. In step 808, the metadata database 710 provides this information to the content delivery logic module 706. The module 706 generates in step 809, based on the received information and request from the user terminal, the manifest 310 having the desired content split into chunks. In step 810, the content of the manifest 310 is provided to the user terminal 700.

At this point, the user terminal has plural URLs that identify the various chunks that form the desired content. In step 812, the user terminal communicates with the mDNS server 702 for receiving the IP address of a given chunk. When receiving this request, the mDNS server 702 enquires in step 814 the mobility node 704 about the correct IP address. The mobility node 704 determines in step 816 the location of the user terminal and chooses the appropriate cache (e.g., closest, or fastest, or one that has a desired feature) and determines the IP address of the URL of the given chunk. In step 818, the mobility node 704 sends the IP address to the mDNS server 702. The mDNS server 702 associates the URL from the user terminal with the IP address received from the mobility node 704 and provides this info to the user terminal in step 822. The mDNS also inserts a TTL value in its answer for forcing the user terminal to again inquire about the next chunk.

The user terminal contacts in step 824 the client delivery function 712 for downloading the given chunk. The client delivery function 712 is associated, for example, with the cache 308 in FIG. 6 and the client delivery function 714 is associated, for example, with the cache 312 in FIG. 6. Other client delivery functions may be present and associated with other caches. In step 826 the user terminal receives the chunk from the client delivery function 712.

When a next chunk of the desired content is intended to be downloaded, the user terminal again contacts in step 828 the mDNS server for the IP address of the new chunk. Assuming that the user terminal has moved from a first cell to a second cell between steps 826 and 828, the mDNS server inquires in step 830 about the IP address of the new chunk and the mobility node 704 makes again that determination and provides the new IP address in step 832 to the mDNS server 702. Steps 834, 836, and 838 are similar to steps 822, 824, and 826 except that the client delivery function 714 is providing the required chunk because the user terminal has moved to another cell. The procedure noted above is repeated for each chunk until all chunks of the desired content are downloaded.

Figure 8:
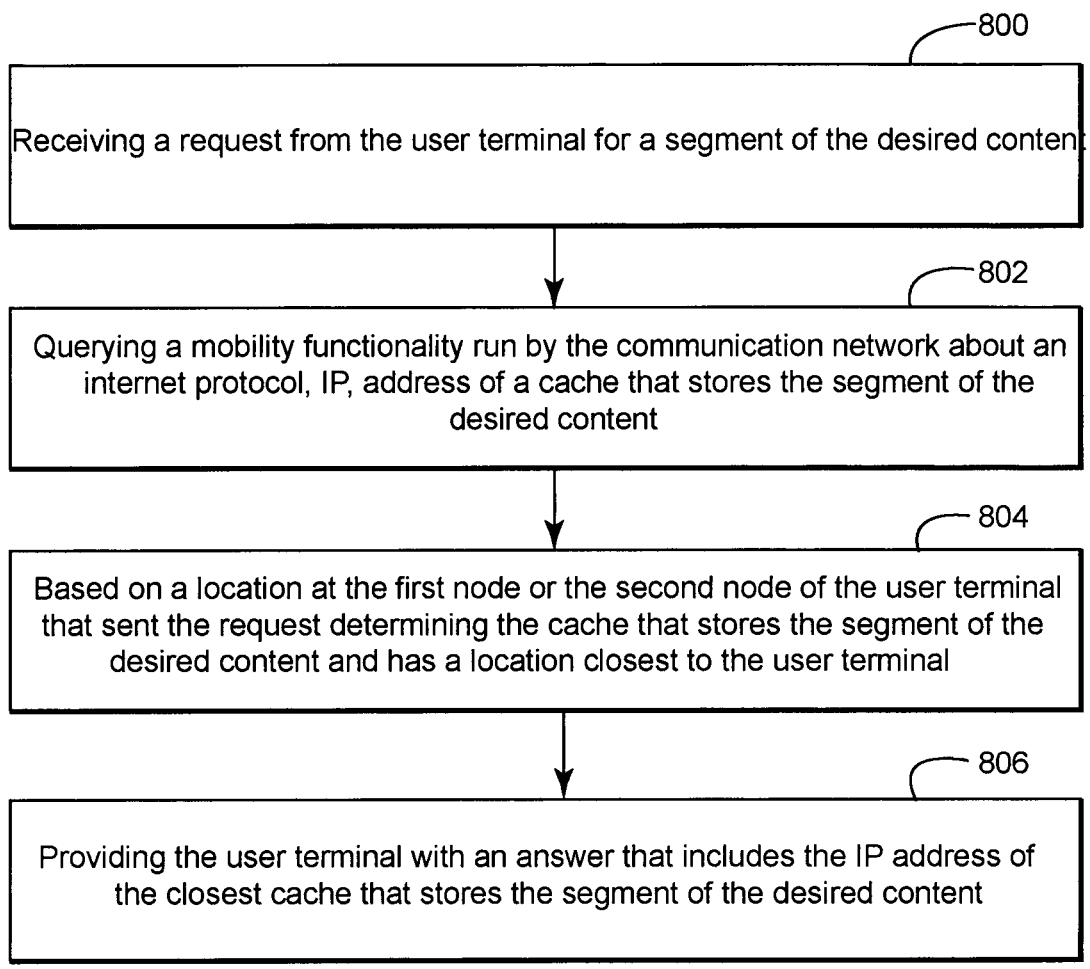
FIG. 8 is a flowchart of a method for providing a user terminal with a most appropriate cache according to an exemplary embodiment.

According to an exemplary embodiment illustrated in FIG. 8, there is a method for selecting, as a user terminal moves in a mobile communication network from a first node to a second node, a cache that stores a desired content and is closest to the user terminal, the cache being one of plural caches distributed at various levels in the mobile communication network. The method includes a step 800 of receiving a request from the user terminal for a segment of the desired content; a step 802 of querying a mobility functionality run by the mobile communication network about an internet protocol, IP, address of a cache that stores the segment of the desired content; a step 804 of based on a location at the first node or the second node of the user terminal that sent the request, determining the cache that stores the segment of the desired content and has a location closest to the user terminal; and a step 806 of providing the user terminal with an answer that includes the IP address of the closest cache that stores the segment of the desired content.

The above described procedures allow mobile user terminals that use HTTP chunk-based streaming to use caching (CDN) technologies in an effective way even in the case when handovers occur in the middle of a streaming session. These procedures ensure that the most relevant cache according to the user terminal position is used to deliver each and every chunk of the media asset.

Figure 9:
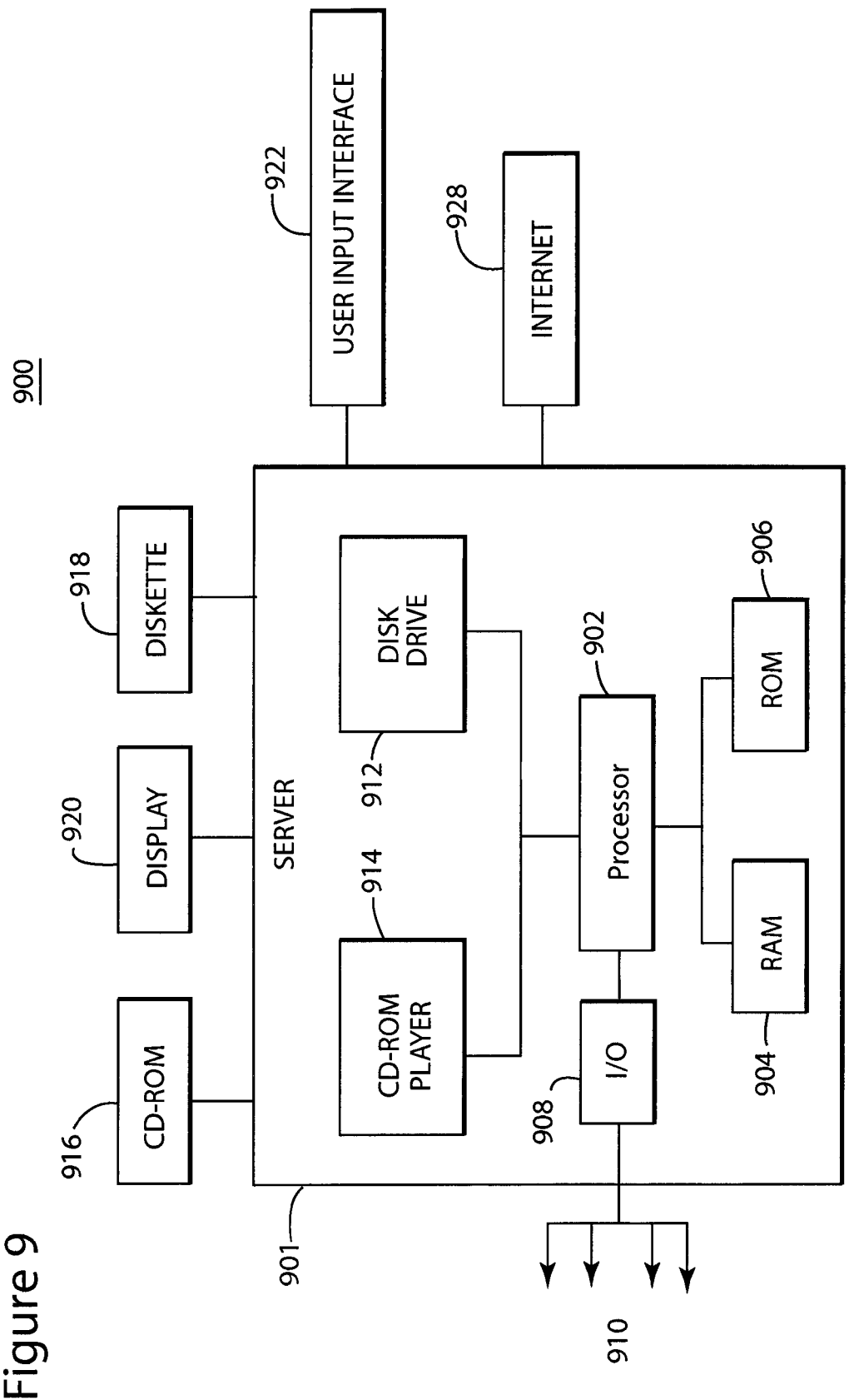
FIG. 9 is a schematic diagram of a node of the communication network.

An example of a representative node/computing arrangement capable of carrying out operations in accordance with the servers of the exemplary embodiments is illustrated in FIG. 9. Hardware, firmware, software or a combination thereof may be used to perform the various steps and operations described herein. The computing arrangement 900 of FIG. 9 is an exemplary computing structure that may be used in connection with such a system.

The exemplary computing arrangement 900 suitable for performing the activities described in the exemplary embodiments may include server 901, which may correspond to the mobility node 704 of FIG. 7. Such a server 901 may include a central processor (CPU) 902 coupled to a random access memory (RAM) 904 and to a read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910, to provide control signals and the like. The processor 902 carries out a variety of functions as is known in the art, as dictated by software and/or firmware instructions.

The server 901 may also include one or more data storage devices, including hard and floppy disk drives 912, CD-ROM drives 914, and other hardware capable of reading and/or storing information such as DVD, etc. In one embodiment, software for carrying out the above discussed steps may be stored and distributed on a CD-ROM 916, diskette 918 or other form of media capable of portably storing information. These storage media may be inserted into, and read by, devices such as the CD-ROM drive 914, the disk drive 912, etc. The server 901 may be coupled to a display 920, which may be any type of known display or presentation screen, such as LCD displays, plasma display, cathode ray tubes (CRT), etc. A user input interface 922 is provided, including one or more user interface mechanisms such as a mouse, keyboard, microphone, touch pad, touch screen, voice-recognition system, etc.

The server 901 may be coupled to other computing devices, such as the landline and/or wireless terminals and associated nodes, via a network. The server may be part of a larger network configuration as in a global area network (GAN) such as the Internet 928, which allows ultimate connection to the various landline and/or mobile client/watcher devices.

The disclosed exemplary embodiments provide a mobility node, a method and a computer program product for providing an appropriate cache to a user terminal in a communication network that may move from a node to another node. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for selecting a cache that stores a desired content requested by a user terminal that moves in a mobile communication network from a first node to a second node, the selected cache being closest to the user terminal, and being one of plural caches distributed at various levels in the mobile communication network, the method comprising:

receiving a request from the user terminal, at a domain name server, DNS, inside the mobile communication network, for a segment of the desired content;

querying, by the DNS, a mobility functionality run by the mobile communication network about an internet protocol, IP, address of a cache that stores the segment of the desired content;

determining, by the mobility functionality, based on a location of the user terminal at the first node or at the second node, the cache that stores the segment of the desired content and has a location closest to the user terminal, sending the IP address of the closest cache to the user terminal so that the DNS associates a uniform resource locator, URL, of the request for the segment with the IP address of the closest cache having the segment; and providing, by the DNS, an answer that includes the IP address of the closest cache that stores the segment of the desired content, to the user terminal.

2. The method of claim 1, wherein the request includes a Uniform Resource Locator, URL, the desired content is provided to the user terminal based on a Hypertext Transfer Protocol, HTTP, and the mobile communication network is a 3rd Generation Partnership Project, 3GPP, network.

3. The method of claim 1, further comprising:
the mobility functionality determining a hand over of the user terminal from the first node to the second node.

4. The method of claim 3, further comprising:
determining the closest cache that stores the segment of the desired content as the cache that is connected to the second node or if the second node does not have a cache, a geographically closest cache to the second node.

5. The method of claim 1, further comprising:
inserting a time to live parameter in the answer to the user terminal, wherein the time to live parameter determines a time for which the answer is valid.

6. The method of claim 5, further comprising:
setting a value of the time to live parameter to a value that is less than a download time of the segment of the desired content.

7. The method of claim 5, further comprising:
after the segment of the desired content is received and before downloading a next segment of the desired content, receiving at the DNS a second request for the next segment of the desired content.

8. The method of claim 7, further comprising:
querying again the mobility functionality about an IP address of a cache that stores the next segment of the desired content.

9. The method of claim 8, wherein the first and second nodes are base stations, nodeBs, enodeBs or radio network controllers, depending on a type of the communication network, and the first and second nodes include between zero and a predetermined number of caches having the desired content.

10. The method of claim 9, further comprising:
determining whether the user terminal is connected to the first node or the second node;
if the user terminal is connected to the first node, providing to the DNS the IP address of a first cache of the first node;
if the user terminal is connected to the second node, providing to the DNS an IP address of a second cache of the second node; and
providing the IP address of the first or second cache to the user terminal.

11. A mobility node in a mobile communication network for selecting a cache that stores a desired content for a user terminal, the mobility node comprising:
a processor configured
to interact with a domain name server, DNS, to receive a client request for a segment of the desired content from the DNS,
to run a mobility functionality which, when the DNS queries the mobility functionality about an internet address, IP, of a cache that stores the segment of the desired content, determines, based on a location of the user terminal that sent the client request, the cache that stores the segment of the desired content and is closest to the client, and
to send the IP address of the cache to the DNS.

* * * * *